G. ERDBRÜGGER.
APPARATUS FOR PRODUCING SCULPTURES.
APPLICATION FILED MAR. 8, 1910.
972,173.  Patented Oct. 11, 1910.
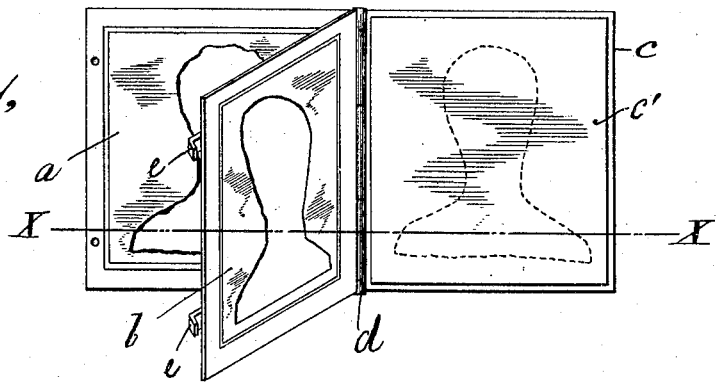
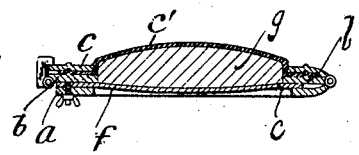
Witnesses:
Inventor
Gustav Erdbrügger

UNITED STATES PATENT OFFICE.

GUSTAV ERDBRÜGGER, OF ANDERTEN, GERMANY, ASSIGNOR, BY MESNE ASSIGNMENTS, TO RELIEFOGRAPH COMPANY, A CORPORATION OF NEW YORK.

APPARATUS FOR PRODUCING SCULPTURES.

972,173.     Specification of Letters Patent.     Patented Oct. 11, 1910.

Application filed March 8, 1910. Serial No. 548,083.

*To all whom it may concern:*

Be it known that I, GUSTAV ERDBRÜGGER, a subject of the German Emperor, residing at Anderten, in the Province of Hanover, in Germany, have invented certain new and useful Improvements in Apparatus for Producing Sculptures, of which the following is a specification.

The present invention pertains to an apparatus for producing positive or negative sculptures from photographs, designs, engravings or pictures of any kind.

The object of my invention is to provide an apparatus for producing sculptures from photographs, etc., that will not only assist the artist, but enable even laymen to produce sculptures, of artistic finish speedily and cheaply, and will also serve as a means of instruction.

Owing to the simplicity of the apparatus, the same may be utilized in various branches of industry, as, for instance, metal, porcelain, glass, stoneware, stucco, wallpaper, celluloid, chocolate, etc.

To make my invention more clear, the same is illustrated in the accompanying drawing, in which—

Figure 1 shows a system of stencils and the elastic base holding the photograph, picture or design and the plastic material; Fig. 2 a cross section thereof in folded or closed position; Fig. 3 a front view of the finished sculpture and Fig. 4 a section therethrough.

My apparatus comprises a plurality of previously prepared, non-flexible stencils, in the present example three, $a$, $b$ and $c$, which correspond in design with the contour of the photograph or picture from which the sculpture is to be molded. To the stencil $c$ a base of elastic material, as a rubber sheet, is suitably attached. The three stencils are hinged together at $d$ and are provided with suitable locking means, as for instance, hooks $e$, etc., whereby the same can be locked together in closed position. The photograph or picture $f$ is suitably fastened between the two stencils $a$ and $b$ and on the elastic base $c'$ the plastic material $g$ is adapted to be placed. Upon impregnation and dampening of the picture $f$ with a suitable chemical, as glycerin or the like, whereby the picture is rendered more flexible, the stencils are folded upon one another and locked in closed position (as shown in Fig. 2), which causes the plastic material and the elastic base extending over the cut out portion of the stencil $c$ to project through that cut out portion outwardly. By pressing against the back of the outwardly projecting part of the rubber sheet the plastic material will be caused to fill the hollowed out portion of the impregnated or dampened picture and make the latter project outwardly through the stencil $a$. By holding the apparatus with the picture upward and pressing with the fingers against the back of the rubber sheet, the sculpture can be produced.

What I claim and desire to secure by Letters Patent is:

An apparatus for producing sculptures, comprising a plurality of previously prepared stencils, and an elastic base, said stencils and base being hinged to one another to fold one on top of the other and means for locking them at the opposite sides to one another.

In testimony whereof I affix my signature in presence of two witnesses.

GUSTAV ERDBRÜGGER.

Witnesses:
    MAX D. ORDMAN,
    JOHN I. CARMODY.